United States Patent
Ramesh et al.

(10) Patent No.: US 7,531,703 B2
(45) Date of Patent: May 12, 2009

(54) METHOD OF RECYCLING A RECYCLABLE PLASTIC

(75) Inventors: Swaminathan Ramesh, Canton, MI (US); Joel Sibul, Windsor, CA (US)

(73) Assignee: Ecoplastifuel, Inc., Farmington Hills, MI (US)

( * ) Notice: Subject to any disclaimer, the term of this patent is extended or adjusted under 35 U.S.C. 154(b) by 170 days.

(21) Appl. No.: 11/539,395

(22) Filed: Oct. 6, 2006

(65) Prior Publication Data
US 2007/0083068 A1 Apr. 12, 2007

Related U.S. Application Data

(60) Provisional application No. 60/724,310, filed on Oct. 6, 2005.

(51) Int. Cl.
*C10G 1/10* (2006.01)
(52) U.S. Cl. .............. 585/241; 201/2.5; 201/8; 201/23; 201/25; 201/28; 201/33; 208/9; 528/481
(58) Field of Classification Search ............ 201/2.5, 201/8, 23, 25, 28, 33; 208/9; 528/481; 585/241
See application file for complete search history.

(56) References Cited

U.S. PATENT DOCUMENTS

| 3,901,951 A | 8/1975 | Nishizaki |
| 3,956,414 A | 5/1976 | Oshima |
| 3,996,022 A | 12/1976 | Larsen |
| 4,108,730 A | 8/1978 | Chen et al. |
| 4,118,281 A | 10/1978 | Yan |
| 4,175,211 A | 11/1979 | Chen et al. |
| 4,851,601 A | 7/1989 | Fukuda et al. |
| 4,871,426 A | 10/1989 | Lechert et al. |
| 4,982,027 A | 1/1991 | Korff et al. |
| 5,136,111 A | 8/1992 | Chum et al. |

(Continued)

FOREIGN PATENT DOCUMENTS

DE 10343964 A1 4/2005

OTHER PUBLICATIONS

Zorriqueta et al, Pyrolysis of polyolefins by Ziegler-Natta catalysts; Third International Symposium on Feedstock recycling of Plastics and other Innovative Plastics Recycling Techniques, Sep. 28, 2005.*

(Continued)

*Primary Examiner*—Glenn Caldarola
*Assistant Examiner*—Prem C. Singh
(74) *Attorney, Agent, or Firm*—Howard & Howard Attorneys PLLC

(57) ABSTRACT

The present invention provides a method of recycling a plastic thereby forming a narrow spectrum of hydrocarbons having from 4 to 14 carbon atoms that can be directly used as gasoline without additional processing or refining. The method includes the step of feeding the plastic, selected from the group of polyethylene, polypropylene, polystyrene, and combinations thereof, into a heated vessel for melting. The method also includes the step of decomposing the plastic at a temperature of from 400° C. to 500° C. in the presence of a metallocene catalyst and a zeolitic catalyst thereby forming the hydrocarbons having from 4 to 14 carbon atoms. The metallocene catalyst includes dichlorobis(2-methylindenyl) zirconium (IV). The zeolitic catalyst includes ammonium Y zeolite and has a pore size of from 1 to 4 Angstroms.

39 Claims, 9 Drawing Sheets

U.S. PATENT DOCUMENTS

| | | | |
|---|---|---|---|
| 5,136,117 | A | 8/1992 | Paisley et al. |
| 5,153,157 | A * | 10/1992 | Hlatky et al. ............... 502/117 |
| 5,158,983 | A | 10/1992 | Stapp |
| 5,326,919 | A | 7/1994 | Paisley et al. |
| 5,364,995 | A | 11/1994 | Kirkwood et al. |
| 5,386,070 | A | 1/1995 | Evans et al. |
| 5,443,716 | A | 8/1995 | Anderson et al. |
| 5,481,052 | A | 1/1996 | Hardman et al. |
| 5,504,267 | A | 4/1996 | Platz |
| 5,744,668 | A | 4/1998 | Zhou et al. |
| 5,753,086 | A | 5/1998 | Guffey et al. |
| 5,981,818 | A | 11/1999 | Purvis et al. |
| 6,107,532 | A | 8/2000 | Saito et al. |
| 6,111,156 | A | 8/2000 | Oballa et al. |
| 6,133,491 | A | 10/2000 | Xing |
| 6,184,427 | B1 | 2/2001 | Klepfer et al. |
| 6,204,218 | B1 | 3/2001 | Flick et al. |
| 6,270,630 | B1 | 8/2001 | Xing |
| 6,534,689 | B1 | 3/2003 | Stankevitch |
| 6,774,271 | B2 | 8/2004 | Jiang |
| 6,833,485 | B2 | 12/2004 | Nichols et al. |
| 6,835,861 | B2 | 12/2004 | Nichols et al. |
| 6,861,568 | B1 | 3/2005 | Guffey et al. |
| 6,866,830 | B2 | 3/2005 | Kwak |
| 6,949,686 | B2 | 9/2005 | Kaminsky |
| 2003/0105376 | A1 | 6/2003 | Foral et al. |
| 2003/0105378 | A1 | 6/2003 | Satek et al. |
| 2005/0221975 | A1 | 10/2005 | Renock et al. |

OTHER PUBLICATIONS

Metallocene as olefin polymerization catalysts: An introduction, Web Page.*

"Conversion of Waste Rubber to Fuel and Other Useful Products", J. Larsen, United States Patent and Trademark Office: Defensive Publication, Nov. 4, 1975. 940 O.G. 7, 1 page.

"Microwave Pyrolysis of Plastics and Laminates", H. Chase et al., Department of Chemical Engineering, University of Cambridge. ESPRC/DTI WRM3 Dissemination Event, Apr. 26, 2001, London, UK. 1 page.

"Liquid Hydrocarbons Obtained by Thermal Converstion of Biomass/Plastic Mixtures", B. N. Kuznetsov et al., Institute of Chemistry and Chemical Technology SB RAS, 5th International Biomass Conference of the Americas, Final Program, Session 3, Sep. 17-21, 2001, Orlando, FL, USA.

"Catalytic Hydrogenolysis at Low Temperature and Pressure of Polyethylene and Polypropylene to Diesels or Lower Alkanes by a Zirconium Hydride Supported on Silica-Alumina: A Step Toward Polyolefin Degradation by the Microscopic Reverse of Ziegler—Natta Polymerization", V. Dufaud et al., Agnew Chem. Int. Ed. 1998, 37 No. 6., pp. 806-810.

"Feedstock Recycling of Polymers by Pyrolysis in a Fluidised Bed", W. Kaminsky et al., Polymer Degradation and Stability, 85 (2004) 1045-1050.

"An Efficient Method of Material Recycling of Municipal Plastic Waste," I. Fortelny et al., Polymer Degradation and Stability, 85 (2004) 975-979.

"Feedstock Recycling of Plastics in Japan", A. Okuwaki, Polymer Degradation and Stability, 85 (2004) 981-988.

"Chemical Recycling of Waste Polystyrene into Styrene over Solid Acids and Bases", Z. Zhang et. al. Ind. Eng. Chem. Res. 1995, vol. 34, pp. 4514-4519.

M. Donner, "Synthese und Pyrolyse von metallocene-katalysierten Ethen/Norbornen-Copolymeren", Jun. 2, 2006, pp. 5-8, University of Hamburg, Bundesstrasse 45, 20146, Hamburg, Germany The relevance of this reference can be found in the English language Summary on pp. 5 through 8 of the document. This reference primarily focuses on the synthesis and pyrolysis of metallocene/methylaluminoxane (MAO) catalyzed ethene/norbornene copolymers.

"Feedstock Recycling And Pyrolysis Of Waste Plastics", Wiley Series in Polymer Science, John Wiley & Sons, Ltd. The Atrium, Southern Gate, Chichester, West Sussex PO19 8SQ, UK, Copyright 2006, pp. 10-11; 45-47; 73-85; 161-380; 714-719; 736-747.

Ozmo Energy/Plastic Waste Recycling—Technology, ttp://www.ozmoenergy.com/technology, Feb. 12, 2007, 3 pages.

PCT International Search Report for PCT/US2006/039588, dated Feb. 28, 2007, 5 pages.

English language translation of DE10343964 from European Patent Office, Mar. 13, 2007, 4 pages.

* cited by examiner

METHOD OF RECYCLING A RECYCLABLE PLASTIC

RELATED APPLICATIONS

This application claims priority to and all the advantages of U.S. Provisional Patent Application Ser. No. 60/724,310, filed Oct. 6, 2005.

FIELD OF THE INVENTION

The present invention generally relates to a method of recycling a plastic. More specifically, the present invention relates to a unique method of decomposing particular plastics in the presence of a metallocene catalyst thereby forming hydrocarbons having specific numbers of carbon atoms.

DESCRIPTION OF THE RELATED ART

Plastics are typically made from non-renewable petroleum resources and are often non-biodegradable. In the United States, plastics are produced in amounts exceeding 115,000 million pounds annually. Plastics are used in many industries to form products for sale in both industrial and residential markets. In industrial markets, plastics are used to form packaging, insulation, construction products, et cetera. In residential markets, plastics are used to form bottles, containers, and the like.

Plastics such as polyethylene terephthalate (PET), high density polyethylene (HDPE), and polyvinyl chloride (PVC), have commonly accepted Recycling Codes of from 1 to 3, respectively, as developed by the American Plastics Council. These aforementioned plastics are more widely recycled and re-used than many other types of plastics. However, plastics such as polyethylenes having Recycling Codes of 2, 4 and 7, polypropylene having a Recycling Code of 5, and polystyrene having a Recycling Code of 6, can also be recycled. Yet, recycling efforts for polyethylenes, polypropylene, and polystyrene have not been maximized.

Only a small fraction of the plastics produced each year are recycled and re-used. To ease in recycling, the plastics are usually crushed, melted, and/or broken down. Plastics that are not recycled and re-used present potential environmental pollution risks when discarded, are not utilized for energy or raw materials, and contribute to an increased reliance on non-renewable petroleum resources. Traditionally, plastics are recycled according to one of two methods including open-and closed-loop recycling. Closed-loop recycling involves using the plastic as an input to make the same product again. Open-loop recycling involves using the plastic as an input to make other products. However, neither of these methods are particularly efficient because of the complexities involved in processing plastics of different colors, textures, and consistencies and producing other products.

One particular type of open loop recycling includes decomposition of a plastic by heating, in the absence of a catalyst, to reverse polymerize the plastic and form monomers, as shown in FIGS. 1 and 2. After the plastic is decomposed, the monomers can then be used in a variety of manufacturing or commercial processes. Traditionally, this decomposition through heating forms monomers having an inconsistent and/or unpredictable number of carbon atoms, as also shown in as FIGS. 1 and 2, while leaving much of the plastic unusable. Formation of monomers having unpredictable numbers of carbon atoms inhibits the monomers from being effectively recycled into other products.

Another particular type of open-loop recycling includes catalytic cracking, which improves on the decomposition of plastic by heating alone. As is known in the art, catalytic cracking involves reverse polymerizing a plastic, in the presence of a catalyst, to form monomers. Traditionally, the catalysts used in catalytic cracking procedures include classical Lewis acids such as $AlCl_3$, metal tetrachloroaluminates, zeolites, superacids, gallosilicates, metals on carbon, and basic oxides. However, many of these catalysts are ineffective in selectively cracking the plastics to form specific monomers. Although traditional catalytic cracking is more efficient in forming monomers than simple decomposition of plastics through heating alone, many of these traditional catalysts still form monomers having an inconsistent and/or unpredictable number of carbon atoms and still leave much of the plastic unusable and un-cracked.

Accordingly, there remains an opportunity to increase the amount of recycling of the plastics having Recycling Codes of 2, 4, 5, 6, and 7 and to increase recycling efficiency. There also remains an opportunity to recycle these particular plastics thereby forming a narrow spectrum of hydrocarbons having specific numbers of carbon atoms. There further remains an opportunity to recycle these particular plastics to reduce potential environmental pollution and decrease reliance on non-renewable petroleum resources by directly using the hydrocarbons having the specific number of carbons atoms as gasoline for vehicles.

SUMMARY OF THE INVENTION AND ADVANTAGES

The present invention provides a method of recycling a plastic. The plastic is selected from the group of polyethylene, polypropylene, polystyrene, and combinations thereof. In a first embodiment, the method includes decomposing the plastic in the presence of a metallocene catalyst thereby forming hydrocarbons having from 4 to 40 carbon atoms. In a second embodiment, the method includes the steps of decomposing the plastic in the presence of a metal catalyst thereby forming hydrocarbons having from 4 to 40 carbon atoms, and exposing the hydrocarbons having from 4 to 40 carbon atoms to the metallocene catalyst, which is different from the metal catalyst, thereby forming hydrocarbons having from 4 to 14 carbon atoms.

The method of the instant invention allows for controlled formation of specific hydrocarbons having from 4 to 40 carbon atoms and/or hydrocarbons having from 4 to 14 carbon atoms. This controlled formation allows the method to efficiently produce the hydrocarbons which can be used as gasoline for vehicles. The method also allows for increased recycling of particular plastics thereby reducing reliance on, and slowing depletion of, non-renewable energy sources because the hydrocarbons having from 4 to 14 carbon atoms are directly usable as automobile gasoline. The method further reduces a need for new mining and drilling operations on unused land and also reduces energy expenditure associated with refining petroleum to form fuels. Still further, the method reduces potential environmental pollution by recycling the plastics that are discarded in landfills and by reducing runoff and soil erosion from the mining and drilling operations. The metallocene catalyst contributes to decomposition of the plastic and direct formation of these hydrocarbons (i.e., the automobile gasoline) without a need for additional processing or purification. Also, the metallocene catalyst is not expensive to dispose of or recycle.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
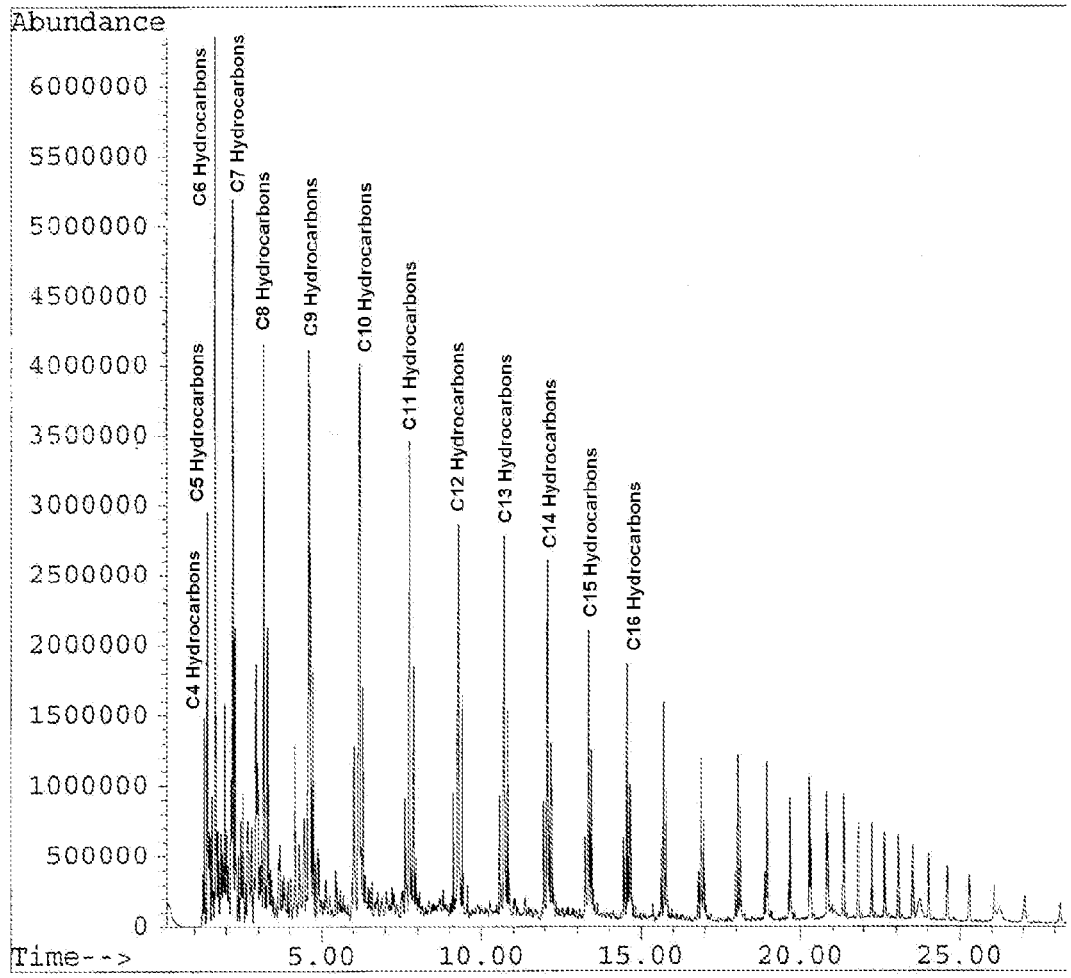
FIG. 1 is a gas chromatograph illustrating identity and relative quantities of a wide spectrum of hydrocarbons having 4 or more carbon atoms formed from decomposition of high density polyethylene at 450-500° C. in the absence of a catalyst according to the prior art.

The present invention provides a method of recycling a plastic. The plastic is recyclable according to the Recycling Codes developed by the American Plastics Council. Prior to recycling, the plastic may be found in commercial products including, but not limited to, containers, packaging, insulation, construction products, and combinations thereof. However, it is contemplated that the plastic may be in any form. The plastic is selected from the group of polyethylene, polypropylene (PP), polystyrene (PS), and combinations thereof. Polypropylene corresponds to Recycling Code 5 and can traditionally be found in food containers, medicine bottles, et cetera. Polystyrene (PS) corresponds to Recycling Code 6 and can typically be found in compact disc jackets, food service applications, food trays, egg cartons, pharmaceutical containers, cups, plates, cutlery, and the like. In one embodiment, the polyethylene is selected from the group of low density polyethylene (LDPE), which corresponds to Recycling Code 4, linear low density polyethylene (LLDPE), which can be classified under Recycling Code 7, high density polyethylene (HDPE), which corresponds to Recycling Code 2, and combinations thereof. Low density polyethylene may be found in dry cleaning products, in food storage bags and bottles, and the like. Linear low density polyethylene is typically found in liquid containers, food containers, et cetera. High density polyethylene is traditionally found in food, cosmetic, and detergent bottles, in storage containers, in cereal box liners, in grocery, trash and retail bags, et cetera.

In another embodiment, the plastic consists essentially of polyethylene, polypropylene, polystyrene, and combinations thereof. In yet another embodiment, the plastic consists of polyethylene, polypropylene, and styrene. In a further embodiment, the plastic consists essentially of polyethylene, polypropylene, and combinations thereof. In yet a further embodiment, the plastic consists of polyethylene and polypropylene. It is contemplated that the plastic may be atactic, isotactic, hemi-isotactic, or syndiotactic, as is known in the art. For descriptive purposes only, the chemical structures of polyethylene, polypropylene, and polystyrene are shown below:

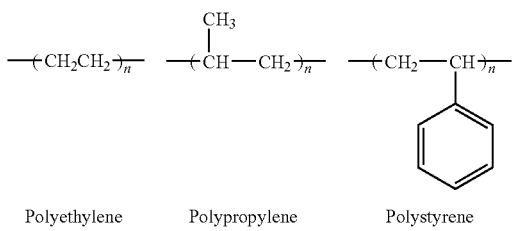

Polyethylene     Polypropylene     Polystyrene wherein n may be any integer.

Also for descriptive purposes only, generic chemical structures of atactic, isotactic, and syndiotactic polypropylene are shown below:

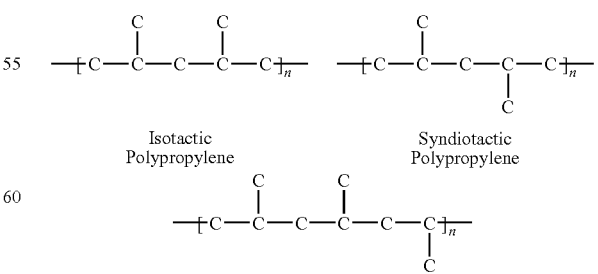

wherein n may be any integer.

In one embodiment, the method includes the step of decomposing the plastic in the presence of a metallocene catalyst thereby forming hydrocarbons having from 4 to 40 carbon atoms. In yet another embodiment, the method consists essentially of the step of decomposing the plastic in the presence of the metallocene catalyst. In a further embodiment, the method consists of the step of decomposing the plastic in the presence of the metallocene catalyst. Preferably, the step of decomposing the plastic directly forms the hydrocarbons having from 4 to 40 carbon atoms, i.e., forms the hydrocarbons without any intervening steps or formation of any stable intermediates that would require additional processing and/or conversion. However, it is contemplated that stable intermediates may be formed and may require additional processing and/or conversion depending on the desired end use of the hydrocarbons In another embodiment, the method includes the steps of decomposing the plastic in the presence of a metal catalyst thereby forming the hydrocarbons having from 4 to 40 carbon atoms and exposing these hydrocarbons to the metallocene catalyst, thereby forming hydrocarbons having from 4 to 14 carbon atoms. More preferably, the hydrocarbons having from 4 to 14 carbon atoms are further defined as having from 4 to 10 carbon atoms.

The metal catalyst is different from the metallocene catalyst and preferably includes titanium oxide. However, it is also contemplated that the metal catalyst may be any metal catalyst and may include Group IV oxides, transition metal oxides, alkali metal oxides, alkaline earth metal oxides, and combinations thereof. In one embodiment, the plastic is preferably decomposed in the presence of from 0.01 to 0.1, and more preferably of from 0.05 to 0.1, percent by weight of the metal catalyst.

Before the plastic is decomposed, the method may include the steps of processing the plastic with physical and/or chemical treatments and introducing the plastic into a vessel. These steps are independent of each other and do not necessarily have to be performed in the method. It is contemplated that the steps of processing the plastic and introducing the plastic into the vessel, if included in the method, may occur in any order.

Preferably, the plastic is processed with the physical and/or chemical treatments to ease introduction into the vessel. When processed with physical treatments, the plastic is preferably cleaned to remove dirt, oil, grease, detergents, food, and exogenous plant and animal contaminants. The plastic may be cleaned with any method known in the art. Preferably, the plastic is cleaned using pressurized water jets, floatation, surfactants, scrubbers and the like, and combinations thereof. The plastic may also be reduced in size through any method known in the art including, but not limited to, shredding, grinding, heating, melting, burning, smashing, dissolving, tearing, crushing, and combinations thereof. The plastic may be reduced to any size including, but not limited to, powder. The plastic may also be physically treated through stirring, mixing, sonicating, through use of radiowaves, magnetic energy, and light energy, and combinations thereof. The plastic may also be treated with the chemical treatments including combination with catalysts, enzymes, fillers, acids, bases, salts, cationic and anionic compounds, processing agents, and combinations thereof. Most preferably, the plastic is cleaned, shredded, and melted into a molten state.

It is to be understood that melting the plastic into a molten state may or may not decompose the plastic depending on temperature and rate of heating. The plastic may be heated at any rate and to any temperature. In one embodiment, the plastic is heated to a temperature of from 75° C. to 250° C., more preferably of from 100° C. to 200° C., and most preferably of from 150° C. to 200° C., to melt the plastic. In yet another embodiment, the plastic is heated to a temperature of 150° C. to melt the plastic. In another embodiment, the plastic is preferably heated at a rate of from 10 to 1000, more preferably of from 50 to 500, and most preferably of from 100 to 200° C./second, to melt the plastic. It is contemplated that the plastic may be melted in one or more heated vessels as shown in FIGS. 6 through 9.

Referring now to the step of introducing the plastic into the vessel, the plastic may be introduced into the vessel in any setting and in any amount. The plastic may be introduced into the vessel in laboratories on a gram and smaller scale and in industrial recycling facilities on a kilogram to kiloton and larger scale. The vessel may be any vessel known in the art and may include one or more laboratory and/or industrial size vessels. In one embodiment, the plastic is continuously fed into the vessel for decomposition, thereby making the method of the instant invention continuous. It is also contemplated that the method may be performed batch-wise, i.e., discontinuously.

Figure 5:
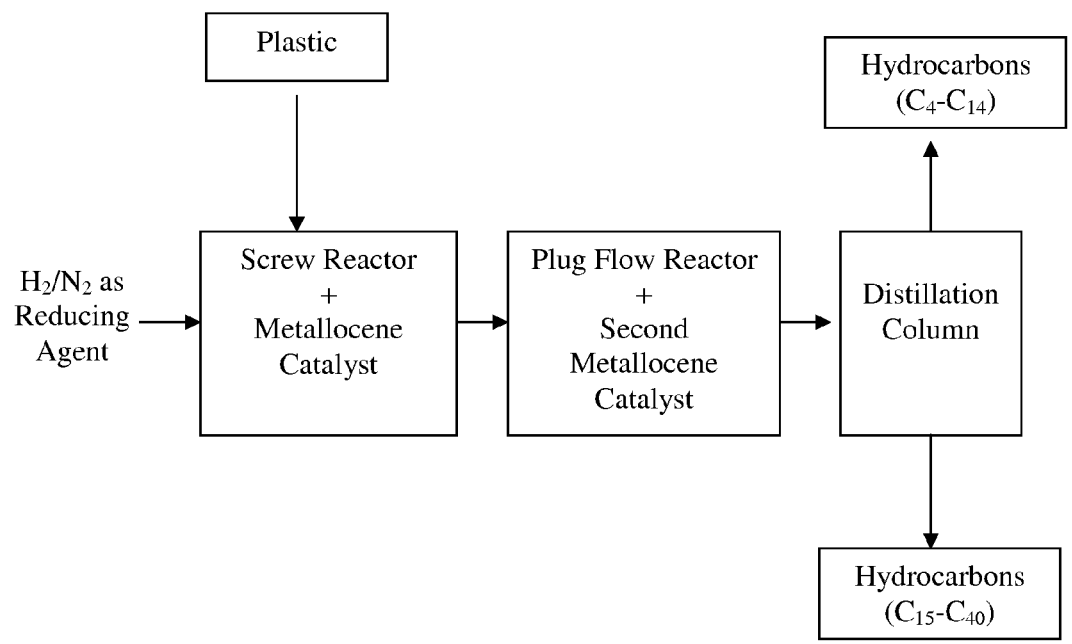
FIG. 5 is schematic view of an embodiment of the present invention generally illustrating a method wherein the plastic, $H_2$ and $N_2$ gasses flow through a screw reactor and a plug reactor including a metallocene catalyst and a second metallocene catalyst, respectively, and also flow through a distillation column.
Figure 6:
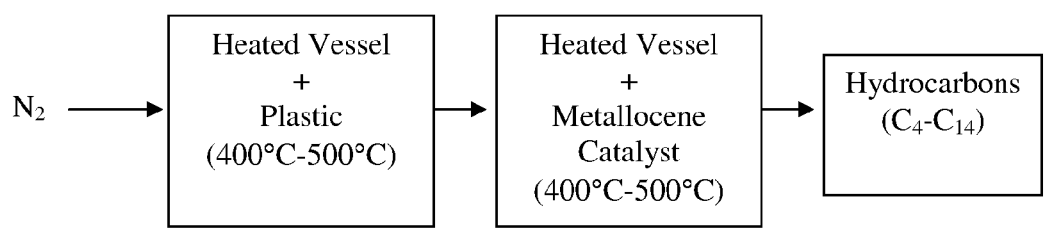
FIG. 6 is a schematic view of an embodiment of the present invention generally illustrating a method wherein the plastic and $N_2$ flow through a first heated vessel and a second heated vessel including the metallocene catalyst.
Figure 7:
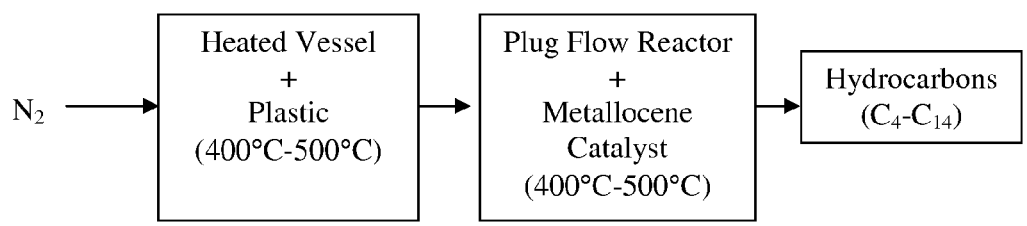
FIG. 7 is a schematic view of an embodiment of the present invention generally illustrating a method wherein the plastic and $N_2$ flow through a heated vessel and a plug flow reactor including the metallocene catalyst.
Figure 8:
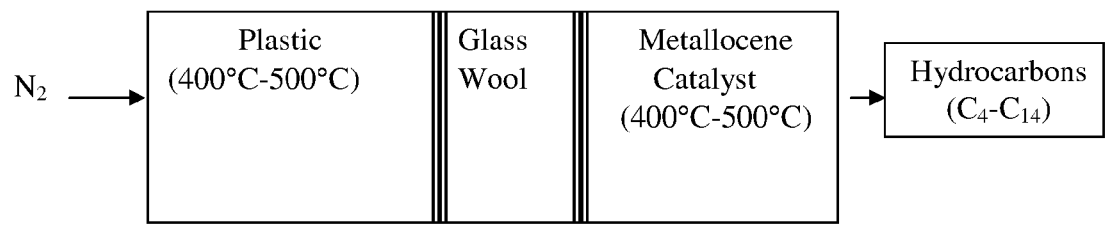
FIG. 8 is a schematic view of an embodiment of the present invention generally illustrating a method wherein the plastic and $N_2$ flow through a reactor including the metallocene catalyst and bisected with glass wool.
Figure 9:
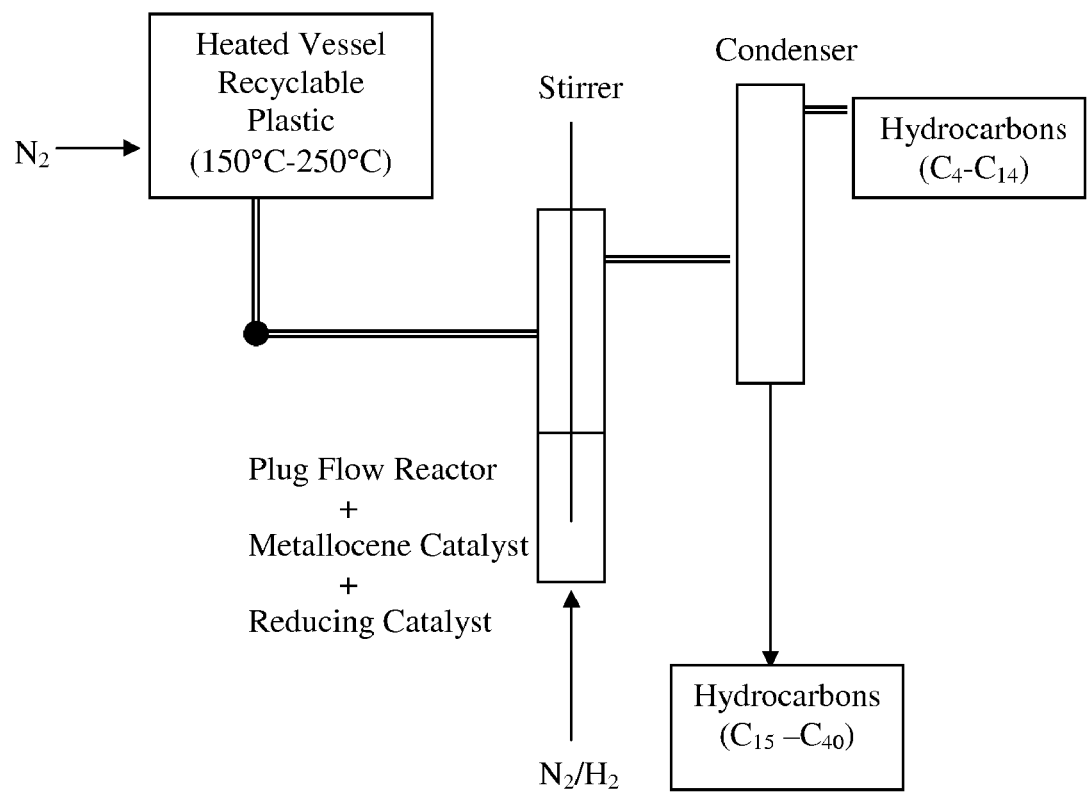
FIG. 9 is a schematic view of an embodiment of the present invention generally illustrating a method wherein the plastic, $N_2$ and $H_2$ flow through a heated vessel, a plug flow reactor including the metallocene catalyst and a reducing catalyst, and a condenser.

The vessel may be a reactor. The reactor may be any reactor known in the art including, but not limited to, continuous screw reactors, plug reactors, and combinations thereof, as shown in FIGS. 5, 7, and 9. In one embodiment, the reactor includes both a continuous screw reactor and a plug reactor, as shown in FIG. 5. The reactor may also be operated in any type of mode including, but not limited to, batch and continuous modes, as first introduced above. Preferably, the reactor is operated in continuous mode to reduce energy consumption, operating costs, size of the reactor, running time, and down time. The reactor may further be operated at any temperature. In one embodiment, the reactor is heated discontinuously from room temperature to a desired temperature for every cycle of the method. In another embodiment, the reactor is heated to the desired temperature and continuously maintained at the desired temperature. Preferably, the reactor is heated to a temperature of from 100° C. to 600° C., more preferably of from 400° C. to 600° C., and most preferably of from 400° C. to 500° C.

Referring now to the step of decomposing the plastic, the plastic is preferably decomposed in the vessel. The plastic may be decomposed by any method known in the art including, but not limited to, heating, actinic and microwave radiation, and combinations thereof. It is contemplated that the temperature of decomposition may be the same as the aforementioned temperatures for melting the plastic or may be different. Preferably, the plastic is decomposed at a temperature of from 100° C. to 600° C., more preferably of from 400° C. to 600° C., and most preferably of from 400° C. to 500° C. When the plastic is decomposed, the plastic is preferably at least partially reverse polymerized, (i.e., broken down), into the hydrocarbons having from 4 to 40 carbon atoms, which will be described in greater detail below.

In one embodiment, the step of decomposing the plastic includes the step of pyrolyzing the plastic. As is known in the art, pyrolysis includes rapid heating of the plastic, i.e., heating the plastic at a rate of at least 50° C./sec, to at least partially reverse polymerize the plastic and form the hydrocarbons. In another embodiment, the step of decomposing the plastic includes the step of thermolyzing the plastic. As is also known in the art, thermolysis includes gradual heating of the plastic, i.e., heating the plastic at a rate of at least 1° C./sec, to at least partially reverse polymerize the plastic and form the hydrocarbons.

Figure 3:
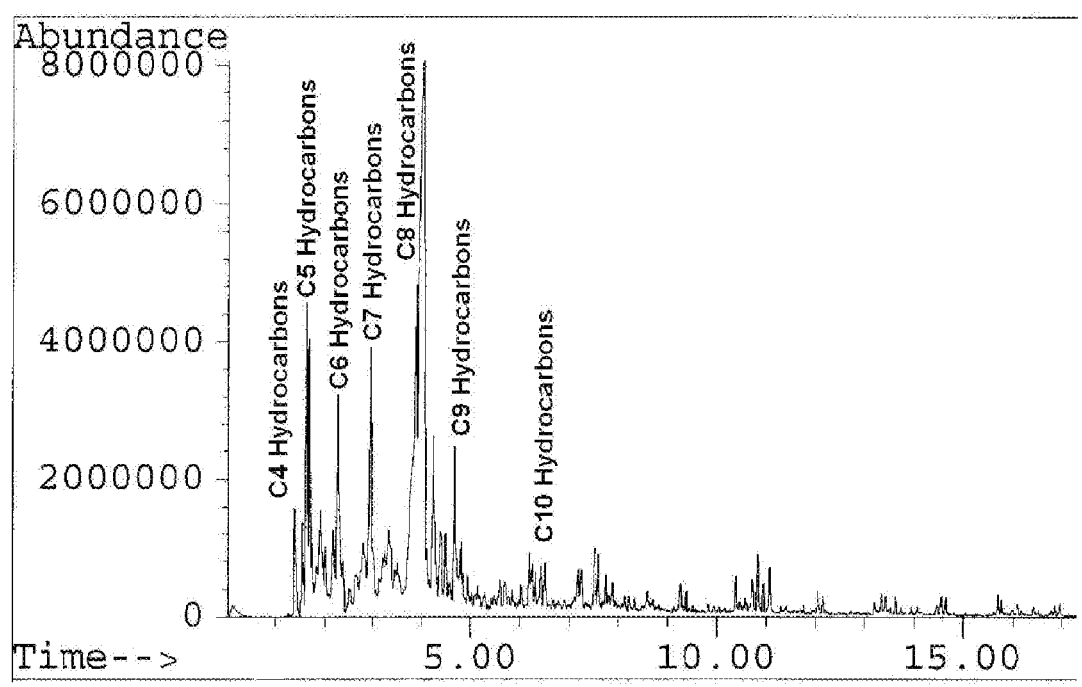
FIG. 3 is a gas chromatograph illustrating the identity and relative quantities of a narrow spectrum of hydrocarbons having from 4 to 10 carbon atoms formed from exposure of the hydrocarbons having 4 or more carbon atoms, as set forth in FIG. 2, to dichlorobis(2-methylindenyl)zirconium (IV) as the metallocene catalyst, according to the method of the present invention.
Figure 4:
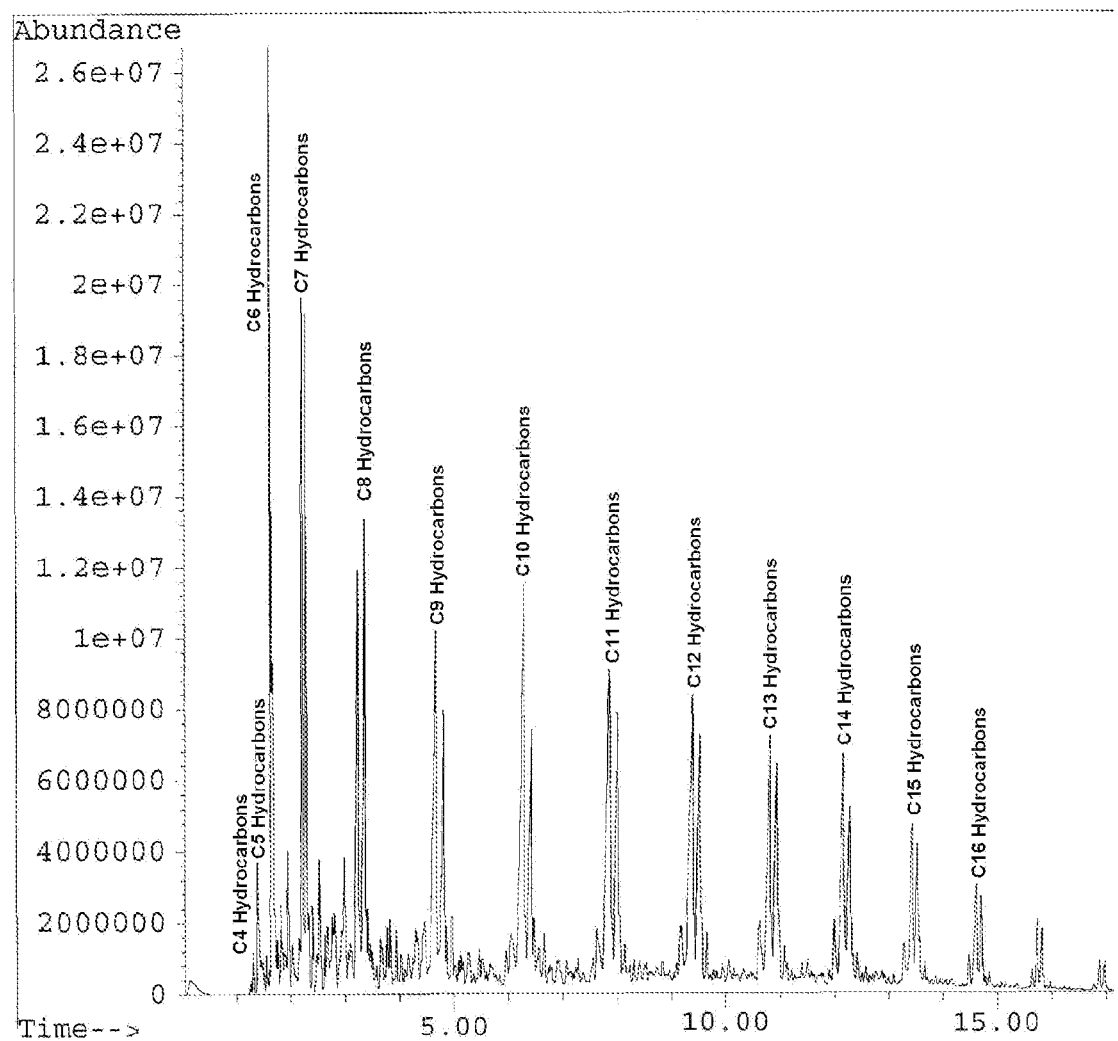
FIG. 4 is a gas chromatograph illustrating identity and relative quantities of a narrow spectrum of hydrocarbons having from 4 to 16 carbon atoms formed from decomposition of high density polyethylene and polypropylene in the presence of dichlorobis(2-methylindenyl)zirconium (IV) as the metallocene catalyst, according to the method of the present invention.

Referring back to the metallocene catalyst, the metallocene catalyst facilitates reverse polymerization of the plastic, i.e., the decomposition of the plastic to form the hydrocarbons. In one embodiment, the method includes the step of introducing the metallocene catalyst into the vessel. Preferably, the metallocene catalyst is introduced into the vessel after the plastic is introduced into the vessel and as the plastic is decomposing. The metallocene catalyst may be introduced into the vessel in a solid, liquid, or gaseous state, or in a combination of states. It is believed that the metallocene catalyst directs the reverse polymerization to favor formation of certain hydrocarbons, e.g., those having from 4 to 40 carbon atoms, as shown in FIGS. 3 and 4. In one embodiment, the hydrocarbons have from 4 to 14 carbon atoms, as also shown in FIGS. 3 and 4. In another embodiment, the hydrocarbons have from 4 to 10 carbon atoms, as further shown in FIG. 4. In a further embodiment, the hydrocarbons only have from 4 to 14 carbon atoms and are substantially free of any molecules having more than 14 carbon atoms. In yet a further embodiment, the hydrocarbons only have from 4 to 10 carbon atoms and are substantially free of any molecules having more than 10 carbon atoms. The terminology "substantially free" includes an amount of hydrocarbons having more than 14 carbon atoms or more than 10 carbon atoms of less than 10 percent by weight. It is also believed that the metallocene catalyst directs the reverse polymerization to favor the formation of the hydrocarbons having from 4 to 14 carbon atoms and/or the hydrocarbons having from 4 to 10 carbon atoms.

For descriptive purposes only, the reverse polymerization of polyethylene, polypropylene, and polystyrene, in the presence of the metallocene catalyst and heat, is shown below in three separate reaction schemes:

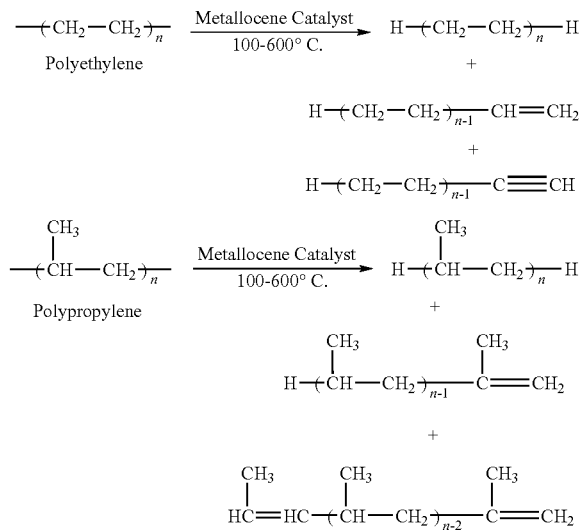

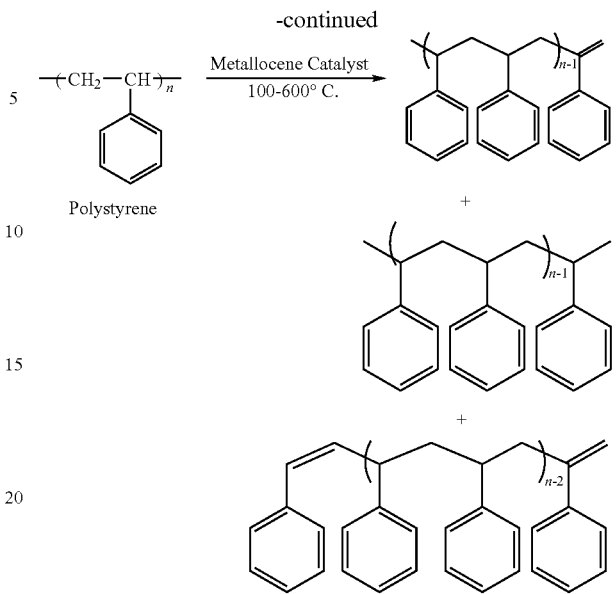

wherein n may be any integer and preferably is from 1 to 40.

Although the exact mechanism of metallocene catalyzed reverse polymerization is not known, it is likely influenced by kinetic, thermodynamic, electronic, and steric interactions of the plastic and the metallocene catalyst and may involve a type of reverse-Arlman-Cossee mechanism. Without intending to be limited by any particular theory, it is believed that the mechanism involves coordination of carbon atoms in the plastic with the metal atom of the metallocene catalyst involving pi bonding- and anti-bonding-orbitals of the carbon atoms and d-orbitals of the metal atom. It is also believed that at temperatures of from 400° C. to 450° C. particular metallocene catalysts may favor formation of certain hydrocarbons, e.g., those having from 4 to 14 carbon atoms.

The metallocene catalyst may be chiral or achiral, may be symmetric or asymmetric, and may be homogeneous or heterogeneous. The metallocene catalyst may include any organic or inorganic moieties known in the art. The terminology "metallocene catalyst" includes both metallocene and post-metallocene catalysts. As is known in the art, metallocenes are organometallic coordination compounds that include cyclopentadienyl derivatives of a transition metal or metal halide, i.e., a constrained metal site is sterically hindered due to orientation between two pi-carbocyclic ligands. Three non-limiting examples of suitable metallocenes include dicyclopentadienyl-metals having the general formula $(C_5H_5)_2M$, dicyclopentadienyl-metal halides having the general formula $(C_5H_5)_2MX_{1-3}$, and monocylopentadienyl-metal compounds with the general formula $(C_5H_5)_2MR_{1-3}$, wherein X is a halogen and R is an organic moiety. When the two pi-carbocyclic ligands are unbridged, the metallocene is non-stereorigid and preferably has $C_2v$ symmetry, i.e., the metallocene has a plane of symmetry. When the two pi-carbocyclic ligands are bridged, a stereorigid metallocene, also known as an ansa metallocene, is formed and preferably has $C_1$, $C_2$, or $C_s$ symmetry, wherein a $C_s$ symmetric molecule has a plane of symmetry and is not chiral. In one embodiment, the plastic is atactic and the metallocene catalyst is an achiral $C_2v$ symmetric metallocene. In another embodiment, the plastic is hemi-isotactic and the metallocene catalyst is a $C_1$ symmetric metallocene. In yet another embodiment, the plastic is isotactic and the metallocene catalyst is a chiral $C_2$ symmetric metallocene. In a further embodiment, the plastic is syndiotactic and the metallocene catalyst is a $C_s$ symmetric metallocene.

Preferably, the metallocene catalyst is selected from the group of Kaminsky catalysts, Brintzinger catalysts, Ewen/Razavi catalysts, and combinations thereof. Most preferably, the metallocene catalyst includes a Kaminsky catalyst. The post metallocene catalyst is preferably selected from the group of Brookhart, Grubbs, and Fujita catalysts, described in greater detail below.

As is known in the art, Kaminsky and Brintzinger catalysts are based on metallocenes of Group IV transition metals and include halogens. These metallocene catalysts are typically homogeneous. For descriptive purposes only, generic chemical structures of Kaminsky and Brintzinger catalysts are shown below:

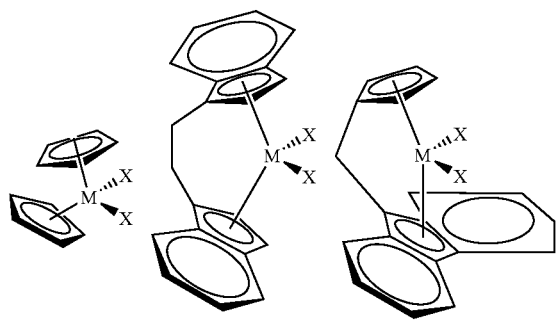

wherein M is preferably a Group IV transition metal including, but not limited to, titanium, zirconium, hafnium, and X is preferably a halogen. In one embodiment of the instant invention, the metallocene catalyst includes zirconium and chlorine. In another embodiment, the metallocene catalyst includes dichlorobis(2-methylindenyl)zirconium (IV). In yet another embodiment, the metallocene catalyst is dichlorobis (2-methylindenyl)zirconium (IV), which has a chemical formula of $C_{20}H_{18}Cl_2Zr$, a molecular weight of 420.49 grams/mole, and a CAS number of 165688-64-2, and is commercially available from Sigma Aldrich Corporation of St. Louis, Mo. For descriptive purposes only, a chemical structure of dichlorobis(2-methylindenyl)zirconium (IV) is shown below:

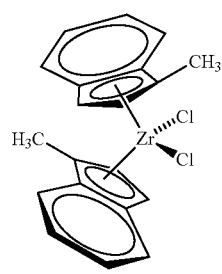

As is also known in the art, Ewen/Razavi catalysts are similar to Kaminsky and Brintzinger catalysts. These catalysts are also typically homogeneous. For descriptive purposes only, a common chemical structure of a Ewen/Razavi catalyst are shown below:

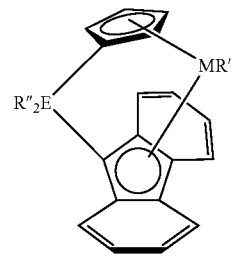

wherein M is preferably a Group IV transition metal, E is preferably selected from the group of carbon and silicon, and R' and R" may include any organic moiety and may be the same or may be different.

Referring now to the post-metallocene catalysts first introduced above, the post-metallocene catalysts are typically homogeneous single-site systems, and their catalytic properties can be controlled by modification of the structure of the catalyst. Many post-metallocene catalysts include early transition metals. However, the post-metallocene catalysts may also include late transition metals including, but not limited to, nickel, palladium, iron, and combinations thereof. Some non-limiting examples of post-metallocene catalysts that are suitable for use in the present invention include Brookhart, Grubbs, and Fujita catalysts, and combinations thereof. For descriptive purposes only, common chemical structures of the Brookhart, Grubbs, and Fujita catalysts are shown below:

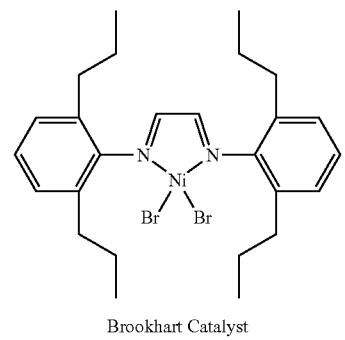

Brookhart Catalyst

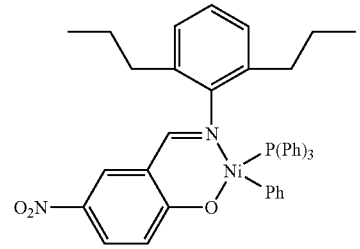

Grubbs Catalyst

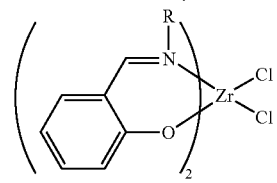

Fujita Catalyst wherein R may be any organic or inorganic moiety known in the art.

The metallocene catalyst is preferably present in an amount of less than or equal to 500 parts by weight per 100 parts by weight of the plastic. More preferably the metallocene catalyst is present in an amount from 0.1 part per one million parts of the plastic to 100 parts of the catalyst per 100 parts of the plastic. Most preferably, the metallocene catalyst is present in an amount from 0.1 part per one million parts of the plastic to 20 parts by weight of the catalyst per 100 parts by weight of the plastic.

It is also contemplated that the step of decomposing the plastic may be further defined as decomposing the plastic in the presence of the metallocene catalyst and a second metallocene catalyst. The method may include the step of introducing the second metallocene catalyst into the vessel. The second metallocene catalyst may be introduced into the vessel at any point in the method and may be introduced in a solid, liquid, or gaseous state, or in a combination of states. The second metallocene catalyst may be any known in the art and may include any of the catalysts contemplated for use as the metallocene catalyst. The second metallocene catalyst may be present in the same range of amounts as is contemplated for the metallocene catalyst. It is contemplated that the step of decomposing the plastic may be further defined as decomposing the plastic in the presence of the metallocene catalyst and a co-catalyst different from the metallocene catalyst and the second metallocene catalyst. The co-catalyst is not required in the method but may include methylalumoxane and/or any other suitable co-catalyst known in the art.

The method may also include the step of adding a mineral catalyst to the vessel. In one embodiment, the method includes the step of decomposing the plastic in the presence of the metallocene catalyst and the mineral catalyst different from the metallocene catalyst. It is contemplated that the metallocene and/or post-metallocene catalysts may be bound, i.e., anchored, to the mineral catalyst or may be disposed (e.g. deposited) on the mineral catalyst. The metallocene and/or post-metallocene catalysts may be bound to the mineral catalyst by any method known in the art including through use of phosphotungstic acid and/or silylation. The mineral catalyst is preferably selected from the group of a silica catalyst, a zeolitic catalyst, and combinations thereof. The silica and zeolitic catalysts may be any known in the art. The zeolitic catalyst is commonly known as a zeolite or molecular sieve. As is known in the art, a zeolite is a hydrated silicate of aluminum and may include sodium and/or calcium. One common chemical formula of zeolites is $Na_2.Al_2O_3.xSiO_2.xH_2O$. The zeolitic catalyst may have controlled pore sizes and functional groups to maximize functionality, decrease reaction temperatures, maximize conversion of the plastic into the hydrocarbons, maximize rate of conversion, maximize specificity of conversion, and minimize tar. Preferably, the zeolitic catalyst has a pore size of from 1 to 5, more preferably of from 1 to 4, and most preferably of from 1 to 3, Angstroms. However, it is contemplated that the zeolitic catalyst may have any pore size. Without intending to be bound by any particular theory, it is believed that the pore size contributes to the formation of the hydrocarbons because the pores trap hydrocarbons of certain molecular weight and size and prevent further decomposition. Suitable non-limiting examples of the zeolitic catalyst include AFG, IFR, OFF, ABW, ACO, SAO, ASV, ISV, OSO, AET, AEI, SAS, BEA, ITE, PAR, AFI, AEL, SAT, BIK, JBW, PAU, AFX, AEN, SAV, BOG, KFI, RON, ANA, AFN, SBE, BRE, LIO, RSN, AST, AFO, SBS, CAS, LOV, RTE, BPH, AFR, SBT, CFI, LTN, RTH, CAN, AFS, VFI, CHI, MAZ, RUT, CGS, AFT, WEI, CON, MEI, SFE, CHA, AFY, ZON, DAC, MEL, SFF, DFT, AHT, DDR, MEP, SGT, EDI, APC, DOH, MFI, STF, ERI, APD, DON, MFS, STI, FAU, ATN, EAB, MON, STT, GIS, ATO, EMT, MOR, TER, LAU, ATS, EPI, MSO, TON, LEV, ATT, ESV, MTF, TSC, LOS, ATV, EUO, MTN, VET, LTA, AWO, FER, MTT, VNI, LTL, AWW, FRA, MTW, VSV, MER, CGF, GME, MWW, WEN, PHI, CLO, GON, NAT, YUG, RHO, CZP, GOO, NES, SOD, DFO, HEU, NON, THO, OSI, and combinations thereof. In one embodiment, the zeolitic catalyst includes ammonium Y.

The method may also include the step of introducing a reducing agent into the vessel and/or reducing the hydrocarbons in the presence of the reducing agent. The reducing agent is preferably selected from the group of hydrogen gas ($H_2$), metal hydrides catalyzed by transition metals, and combinations thereof, but may be any known in the art. In one embodiment, the reducing agent includes $H_2$. In another embodiment, the reducing agent includes $H_2$ modified with nitrogen gas ($N_2$) added as a gas stream to the vessel to aid in eventual removal of the hydrocarbons from the vessel. The reducing agent may react with the plastic alone, with the hydrocarbons, with the metallocene catalyst, and/or with a reducing catalyst, described in greater detail below. The reducing agent may react in a symmetrical or asymmetrical manner and in a directed or non-directed manner. The reducing agent may be added to the vessel in any amount and at any pressure. The reducing agent preferably reacts with the hydrocarbons and acts in concert with the metallocene catalyst to at least partially reduce hydrocarbons having carbon-carbon double and triple bonds to hydrocarbons having carbon-carbon single bonds, i.e., saturated hydrocarbons. The reducing agent may be added at any point in the method. Preferably, the reducing agent is added to the vessel after the plastic has been added to the vessel and the plastic is decomposed to at least partially form the hydrocarbons. In one embodiment, the metallocene catalyst and the reducing agent are present together in the vessel and act synergistically to reverse polymerize the plastic and reduce the hydrocarbons simultaneously. Preferably, the reducing agent is added in an amount of from 0.5 to 5, more preferably of from 0.6 to 2, and most preferably of from 0.7 to 1, moles, per one mole of the plastic. Preferably, the reducing agent is added at a pressure of from 1 to 20, more preferably of from 1 to 10, and most preferably of from 1 to 2, atmospheres.

For descriptive purposes only, the reaction of the reducing agent with the hydrocarbons is shown below in three separate reaction schemes:

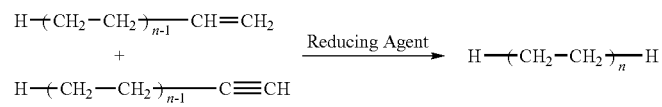

-continued

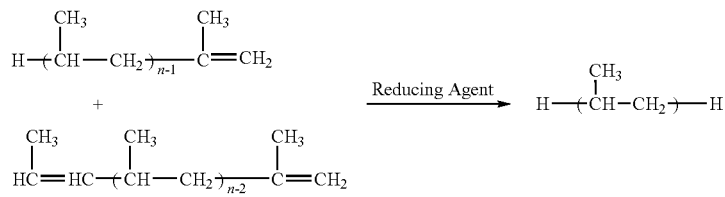

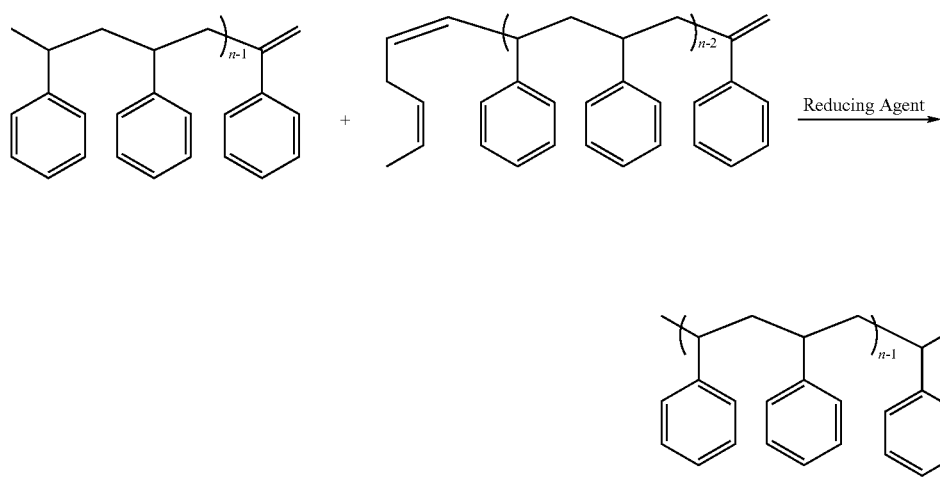

wherein n may be any integer.

The method may also include the step of introducing the reducing catalyst into the vessel. In one embodiment, the step of reducing the hydrocarbons may be further defined as reducing the hydrocarbons in the presence of the reducing agent and the reducing catalyst. The reducing catalyst may be added to the vessel to increase efficiency of the reducing agent. The reducing catalyst may act in concert with the reducing agent and the metallocene catalyst. The reducing catalyst is preferably added to the vessel immediately preceding, concurrently with, or immediately after addition of the reducing agent. However, it is contemplated that the reducing catalyst may be added at any time. The reducing catalyst is preferably selected from the group of Raney Nickel, tris (triphenylphosphine)-rhodium(I) chloride, palladium carbon, and combinations thereof. It is to be appreciated that the terminology palladium carbon includes the well known organometallic catalyst known as "palladium on carbon." Other non-limiting examples of the reducing catalyst include mono- and di-hydride catalysts, metallic catalysts including, but not limited to, platinum, palladium, nickel, rhodium, ruthenium, iridium, titanium, Wilkinson's catalyst, Crabtree's catalyst, and combinations thereof. For descriptive purposes only, chemical structures of tris(triphenylphosphine)-rhodium(I) chloride, Wilkinson's catalyst, and Crabtree's catalyst are shown below:

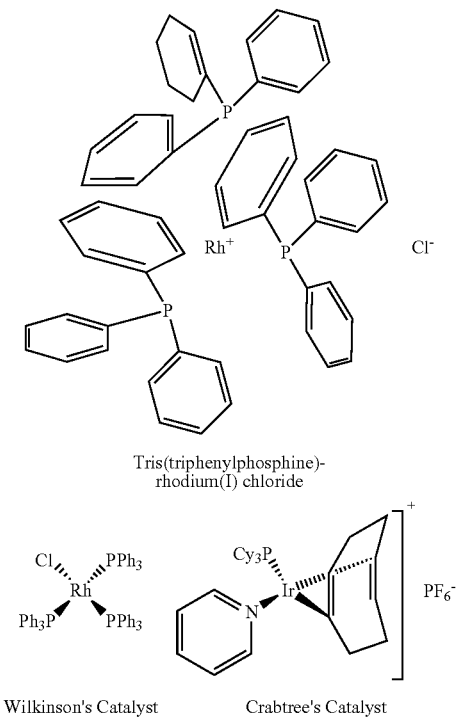

In addition to the aforementioned steps, the method may also include the step of monitoring the formation of the hydrocarbons. The hydrocarbons may be monitored online, offline, or through a combination of both online and offline monitoring. Also, the step of monitoring may include utilizing any monitoring technique known in the art. The monitoring technique may include, but is not limited to, spectroscopy, and chromatography. The spectroscopy may include mass, infrared, atomic emission, atomic absorption, nuclear magnetic resonance, Ramen, fluorescence, x-ray, atomic fluorescence, plasma emission, direct-current plasma, inductively-coupled plasma, laser induced breakdown, laser-induced plasma, microwave-induced plasma, spark and/or arc, UV, photoemission, force, dielectric, circular dichroism, rotational, vibrational, rigid rotor, EPR, spectral power distribution, metamerism, spectral reflectance, acoustic, dynamic mechanical, electron energy loss, and Auger electron, spectroscopies, and combinations thereof. The chromatography may include gas, liquid, ion-exchange, affinity, thin layer, supercritical fluid, and column, chromatographies, and combinations thereof. In one embodiment, the step of monitoring includes a combination of gas chromatography and mass spectroscopy.

It is also contemplated that the method may include the step of purifying the hydrocarbons. The hydrocarbons may be purified by any method known in the art. In one embodiment, the hydrocarbons are distilled to increase purity and separate the hydrocarbons from any residue of the decomposed plastic. In another embodiment, the hydrocarbons having from 4 to 40 carbon atoms are distilled to separate fractions of hydrocarbons having from 4 to 14 carbon atoms and/or fractions of hydrocarbons having from 4 to 10 carbon atoms. It is contemplated that the hydrocarbons having from 4 to 14 carbon atoms and/or the hydrocarbons having from 4 to 10 carbon atoms may comprise gasoline that can be directly sold at commercial gas stations and used in automobiles.

The method may further include the step of adding an octane increasing agent to the plastic and/or hydrocarbons. The octane increasing agent may be any octane increasing agent known in the art including, but not limited to, aromatic hydrocarbons. Preferably, the octane increasing agent includes ethylbenzene from reduction of styrene from polystyrene. In one embodiment, there is sufficient ethyl benzene formed from the decomposition of the instant plastic such that the octane increasing agent does not need to be added to the hydrocarbons. In another embodiment, the octane increasing agent is preferably added in an amount of less than or equal to 30, more preferably of less than or equal to 20, and most preferably of less than or equal to 10, parts by weight per 100 parts by weight of the plastic. It is to be understood that if the plastic includes polystyrene, the octane increasing agent may not need to be added or may be added in lesser amounts. After decomposition of the plastic, the hydrocarbons may be removed by boiling or with a stream of gas including, but not limited to, helium, neon, argon, krypton, xenon, nitrogen, hydrogen, and combinations thereof.

EXAMPLES

A series of plastics (Plastics 1-3) are recycled according to the method of the present invention. Plastic 1 is 100% high density polyethylene and is decomposed in the presence of dichlorobis(2-methylindenyl)zirconium (IV) disposed on glass wool. Plastic 2 is 100% high density polyethylene and is decomposed in the presence of dichlorobis(2-methylindenyl) zirconium (IV) disposed on ammonium Y zeolite powder. Plastic 3 includes a 44:56 mixture, by weight, of high density polyethylene and polypropylene and is decomposed in the presence of dichlorobis(2-methylindenyl)zirconium (IV) disposed on ammonium Y zeolite molecular sieve beads.

The Plastics 1-3 are cut into pieces and loaded into a heated vessel in the presence of the aforementioned metallocene catalysts. The Plastics 1-3 are exposed to a constant stream of nitrogen ($N_2$) and heated to 600° C. At approximately 450° C., a content of the hydrocarbons is collected from each of the Plastics 1-3 and analyzed via GC/MS (gas chromatography/mass spectroscopy) to determine a percent yield of the product recovered, i.e., the hydrocarbons having from 4 to 40 carbons. The GC/MS also analyzes a percent of the recovered product that is hydrocarbons having from 4 to 14 carbon atoms, e.g., gasoline. The amounts of the Plastics 1-3, the metallocene catalysts, percent yields, and the percents of the recovered products, are set forth in Table 1, wherein all amounts are in grams unless otherwise noted. The results of the GC analysis of Plastic 2 are set forth in FIG. 4.

TABLE 1

|  | Plastic 1 | Plastic 2 | Plastic 3 |
| --- | --- | --- | --- |
| High Density Polyethylene | 9 | 18 | 22 |
| Polypropylene | 0 | 0 | 28 |
| Total | 9 | 18 | 50 |
| Metallocene Catalyst on Glass Wool | 5 | 3 | — |
| Metallocene Catalyst on Zeolite Powder | — | 2 | — |
| Metallocene Catalyst on Molecular Sieve Beads | — | — | 5 |
| Molecular Sieve Beads | — | — | — |
| Titanium Oxide | — | — | — |
| Percent Yield of Product Recovered ($C_4$–$C_{40}$) | 80 | 78 | 90 |
| Percent Gasoline ($C_4$–$C_{14}$) | 61 | 70 | 83 |
| Figure Number | N/A | FIG. 4 | N/A |

A second series of plastics including high density polypropylene (Comparative Plastics 1 and 2) are recycled but not according to the methods of the present invention. The Comparative Plastics 1 and 2 are cut into pieces and loaded into a heated vessel. The Comparative Plastics 1 and 2 are loaded into the vessel in the absence of any metallocene catalyst. The Comparative Plastic 2 is loaded into the vessel in the presence of a titanium oxide catalyst disposed on glass wool. The Comparative Plastics 1 and 2 are exposed to a constant stream of nitrogen ($N_2$) and heated to 600° C. At approximately 450° C., a content of the hydrocarbons is collected from each of the Comparative Plastics 1 and 2 and analyzed via GC/MS (gas chromatography/mass spectroscopy) determine a percent yield of the product recovered, i.e., the hydrocarbons having from 4 to 40 carbons. The GC/MS also analyzes a percent of the recovered product that is hydrocarbons having from 4 to 14 carbon atoms, e.g., gasoline. The amounts of the Comparative Plastics 1 and 2, the metal catalyst, the percent yields, and the percents of recovered product are further set forth in Table 2, wherein all amounts are in grams unless otherwise noted. The results of the GC analysis of Comparative Plastic 1 are set forth in FIGS. 1 and 2.

TABLE 2

Figure 2:
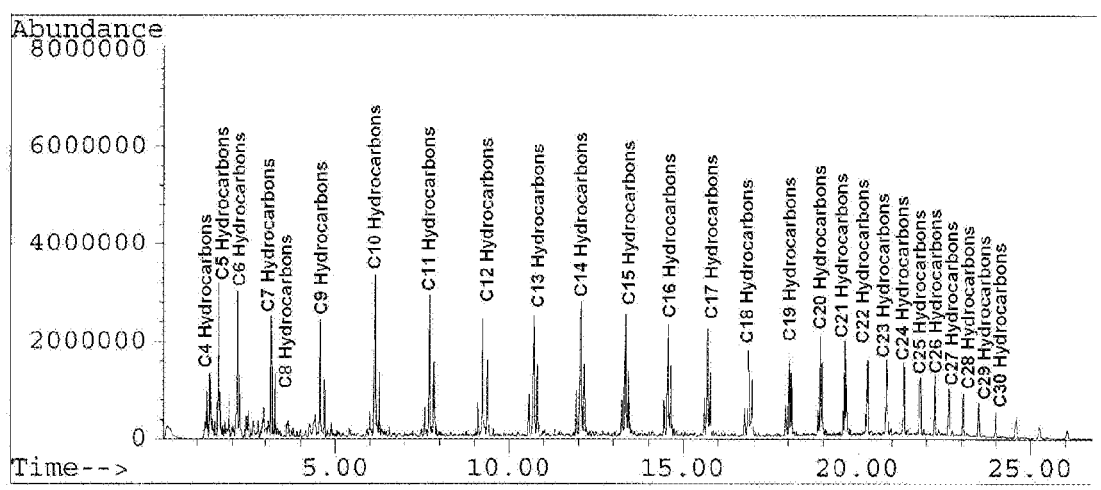
FIG. 2 is a gas chromatograph illustrating identity and relative quantities of a wide spectrum of hydrocarbons having 4 or more carbon atoms formed from decomposition of high density polyethylene at 400-450° C. in the presence of a $TiO_2$ catalyst according to the prior art.

|  | Comparative Plastic 1 | Comparative Plastic 2 |
|---|---|---|
| High Density Polyethylene | 11.2 | 11.2 |
| Polypropylene | 0 | 0 |
| Total | 11.2 | 11.2 |
| Metallocene Catalyst on Glass Wool | — | — |
| Metallocene Catalyst on Molecular Sieve Powder | — | — |
| Metallocene Catalyst on Molecular Sieve Beads | — | — |
| Molecular Sieve Beads | — | — |
| Titanium Oxide | — | 5 |
| Percent Yield of Product Recovered ($C_4$–$C_{40}$) | 70 | 63 |
| Percent Gasoline ($C_4$–$C_{14}$) | 40 | 40 |
| Figure Number | FIG. 1 | FIG. 2 |

A fourth plastic (Plastic 4) is also recycled according to the method of the instant invention. Plastic 4 includes 100% high density polyethylene, is cut into pieces, and is loaded into a heated vessel outside the presence of a catalyst. The Plastic 4 is exposed to a constant stream of nitrogen ($N_2$) and heated to a temperature of from 450 to 500° C. to form hydrocarbons having from 4 to 40 carbon atoms. Subsequently, the hydrocarbons are exposed to a mixture of dichlorobis(2-methylindenyl)zirconium (IV) disposed on a ammonium Y zeolite molecular sieve powder, dichlorobis(2-methylindenyl)zirconium (IV) disposed on ammonium Y zeolite molecular sieve beads, and the ammonium Y zeolite molecular sieve beads without any of the metallocene catalyst, and heated to approximately 400° C. At approximately 200° C., a content of the hydrocarbons is collected and analyzed via GC/MS (gas chromatography/mass spectroscopy) a percent yield of the product recovered, i.e., the hydrocarbons having from 4 to 40 carbons. The GC/MS also analyzes a percent of the recovered product that is hydrocarbons having from 4 to 14 carbon atoms, e.g., gasoline. The amount of the Plastic 4, the metallocene catalyst, the percent yields, and the percents of recovered product are set forth in Table 3, wherein all amounts are in grams unless otherwise noted. The results of the GC analysis of Plastic 4 (No Metallocene Catalyst) are set forth in FIGS. 1 and 2. The results of the GC analysis of Plastic 4 (Metallocene Catalyst) are set forth in FIG. 3.

TABLE 3

|  | Plastic 4 (No Metallocene Catalyst) | Plastic 4 (Metallocene Catalyst) |
|---|---|---|
| High Density Polyethylene | 30 | — |
| Hydrocarbons ($C_4$–$C_{40}$) | — | 8.4 |
| Total | 30 | 8.4 |
| Metallocene Catalyst on Glass Wool | — | 0 |
| Metallocene Catalyst on Molecular Sieve Powder | — | 0.5 |
| Metallocene Catalyst on Molecular Sieve Beads | — | 1.5 |
| Molecular Sieve Beads | — | 3 |
| Percent Yield of Product Recovered ($C_4$–$C_{40}$) | 28 | 90 |
| Percent Gasoline ($C_4$–$C_{14}$) | 40 | 97 |
| Figure Number | FIG. 1 | FIG. 3 |

The Titanium Oxide catalyst disposed on glass wool is synthesized by slurrying 10 grams of titanium oxide into toluene and poured onto 100 grams of glass wool. The toluene is then evaporated by heating at 110° C. for two hours.

The Metallocene Catalyst disposed on the glass wool is synthesized by dissolving 50 grams of dichlorobis(2-methylindenyl)zirconium (IV) into 10 grams of toluene and submersing 20 grams of glass wool in the toluene. The toluene is then evaporated by heating at 110° C. for four hours.

The Metallocene Catalyst disposed on the ammonium Y zeolite powder is synthesized by dissolving 60 grams of dichlorobis(2-methylindenyl)zirconium (IV) in 10 grams of toluene and adding 6 grams of the zeolite powder having a pore size of 4 Angstroms to the toluene to form a mixture. The mixture is stirred and the toluene is removed by heating at 110° C. for four hours.

The Metallocene Catalyst disposed on the molecular sieve beads is synthesized by dissolving 120 mg dichlorobis(2-methylindenyl)zirconium (IV) in 10 grams of toluene and 50 grams of methyl ethyl ketone to form a mixture. 110 grams of ammonium Y zeolite beads having a pore size of 4 Angstroms and a diameter of $\frac{1}{16}^{th}$ inch is added to the mixture and agitated. The toluene and methyl ethyl ketone are removed by heating at 110° C. for five hours.

The results of the GC analyses of Plastics 1-4 demonstrate that the method of the instant invention efficiently recycles plastics and specifically forms both hydrocarbons having from 4 to 40 carbon atoms and hydrocarbons having from 4 to 14 carbon atoms, i.e., gasoline. The efficient formation of gasoline reduces reliance on, and slows depletion of, non-renewable energy sources. The results also demonstrate that the instant method forms both hydrocarbons having from 4 to 40 carbon atoms and hydrocarbons having from 4 to 14 carbon atoms in higher percentages and with higher efficiency than the methods that do not include the metallocene catalyst.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of recycling a plastic selected from the group of polyethylene, polypropylene, polystyrene, and combinations thereof, said method comprising decomposing the plastic in the presence of a metallocene catalyst thereby forming hydrocarbons having from 4 to 40 carbon atoms.

2. A method as set forth in claim 1 wherein the step of decomposing the plastic occurs at a temperature of from 400° C. to 600° C.

3. A method as set forth in claim 1 further comprising the step of purifying the hydrocarbons.

4. A method as set forth in claim 3 wherein the purified hydrocarbons comprise gasoline.

5. A method as set forth in claim 1 wherein the polyethylene is selected from the group of low density polyethylene, linear low density polyethylene, high density polyethylene, and combinations thereof.

6. A method as set forth in claim 1 wherein the plastic consists essentially of polyethylene, polypropylene, and combinations thereof.

7. A method as set forth in claim 6 wherein the polyethylene is selected from the group of low density polyethylene, linear low density polyethylene, high density polyethylene, and combinations thereof.

8. A method as set forth in claim 1 wherein the hydrocarbons have from 4 to 14 carbon atoms.

9. A method as set forth in claim 1 wherein the hydrocarbons have from 4 to 10 carbon atoms.

10. A method as set forth in claim 1 wherein the metallocene catalyst comprises a Kaminsky catalyst.

11. A method as set forth in claim 10 wherein the Kaminsky catalyst comprises zirconium.

12. A method as set forth in claim 10 wherein the Kaminsky catalyst comprises dichlorobis (2-methylindenyl)zirconium (IV).

13. A method as set forth in claim 1 wherein the metallocene catalyst comprises dichlorobis (2-methylindenyl)zirconium (IV).

14. A method as set forth in claim 1 wherein the step of decomposing the plastic occurs in the presence of the metallocene catalyst and a mineral catalyst different from the metallocene catalyst.

15. A method as set forth in claim 14 wherein the mineral catalyst is selected from the group of a silica catalyst, a zeolitic catalyst, and combinations thereof.

16. A method as set forth in claim 14 wherein the metallocene catalyst is bound to the mineral catalyst.

17. A method as set forth in claim 14 wherein the metallocene catalyst is disposed on the mineral catalyst.

18. A method as set forth in claim 14 wherein the mineral catalyst has a pore size of from 1 to 4 Angstroms.

19. A method as set forth in claim 1 wherein the plastic is decomposed in the presence of from 0.1 part of the metallocene catalyst per one million parts of the plastic to 100 parts of the metallocene catalyst per 100 parts of the plastic.

20. A method as set forth in claim 1 further comprising the step of reducing the hydrocarbons in the presence of a reducing agent.

21. A method as set forth in claim 20 wherein the reducing agent is hydrogen gas.

22. A method as set forth in claim 20 wherein the step of reducing the hydrocarbons occurs in the presence of the reducing agent and a reducing catalyst.

23. A method as set forth in claim 22 wherein the reducing catalyst is selected from the group of Raney Nickel, tris (triphenylphosphine)-rhodium chloride, palladium carbon, and combinations thereof.

24. A method as set forth in claim 1 wherein the step of decomposing the plastic occurs in the presence of the metallocene catalyst and a second metallocene catalyst different from the metallocene catalyst.

25. A method as set forth in claim 1 wherein the step of decomposing the plastic occurs in the presence of the metallocene catalyst, a mineral catalyst, and a second metallocene catalyst, wherein the mineral catalyst is different from the metallocene catalyst and the second metallocene catalyst, and the second metallocene catalyst is different from the metallocene catalyst.

26. A method as set forth in claim 1 wherein the step of decomposing occurs at a temperature of from 400° C. to 500° C., the plastic is decomposed in the presence of the metallocene catalyst and a zeolitic catalyst having a pore size of from 1 to 4 Angstroms, the polyethylene is selected from the group of low density polyethylene, linear low density polyethylene, high density polyethylene, and combinations thereof, the hydrocarbons have from 4 to 14 carbon atoms, and the metallocene catalyst is dichlorobis(2-methylindenyl) zirconium (IV).

27. A method of recycling a plastic selected from the group of polyethylene, polypropylene, polystyrene, and combinations thereof, said method comprising the steps of:
  decomposing the plastic in the presence of a metal catalyst thereby forming hydrocarbons having from 4 to 40 carbon atoms; and
  exposing the hydrocarbons having from 4 to 40 carbon atoms to a metallocene catalyst different from the metal catalyst thereby forming hydrocarbons having from 4 to 14 carbon atoms.

28. A method as set forth in claim 27 wherein the step of decomposing the plastic occurs at a temperature of from 400° C. to 600° C.

29. A method as set forth in claim 27 wherein the polyethylene is selected from the group of low density polyethylene, linear low density polyethylene, high density polyethylene, and combinations thereof.

30. A method as set forth in claim 27 wherein the metallocene catalyst comprises a Kaminsky catalyst.

31. A method as set forth in claim 30 wherein the Kaminsky catalyst comprises dichlorobis (2-methylindenyl)zirconium (IV).

32. A method as set forth in claim 27 wherein the step of decomposing the plastic occurs in the presence of the metallocene catalyst and a mineral catalyst different from the metallocene catalyst.

33. A method as set forth in claim 32 wherein the mineral catalyst has a pore size of from 1 to 4 Angstroms.

34. A method as set forth in claim 27 wherein the step of exposing the hydrocarbons is further defined as purifying the hydrocarbons having from 4 to 40 carbon atoms.

35. A method as set forth in claim 27 wherein the hydrocarbons having from 4 to 40 carbon atoms are further defined as having from 4 to 14 carbon atoms.

36. A method as set forth in claim 35 wherein the hydrocarbons having from 4 to 14 carbon atoms are further defined as having from 4 to 10 carbon atoms.

37. A method as set forth in claim 27 wherein the hydrocarbons having from 4 to 14 carbon atoms are further defined as having from 4 to 10 carbon atoms.

38. A method as set forth in claim 27 wherein the metal catalyst is titanium oxide.

39. A method as set forth in claim 27 further comprising the step of melting the plastic and wherein the step of decomposing the plastic occurs at a temperature of from 400° C. to 500° C., the hydrocarbons having from 4 to 40 carbon atoms are exposed to the metallocene catalyst and a zeolitic catalyst having a pore size of from 1 to 4 Angstroms, the polyethylene is selected from the group of low density polyethylene, linear low density polyethylene, high density polyethylene, and combinations thereof, the metallocene catalyst is dichlorobis (2-methylindenyl)zirconium (IV), and the metal catalyst is titanium oxide.

* * * * *